Jan. 27, 1948.  E. R. McCARTNEY  2,435,089
GAS PURIFICATION AND DEHYDRATION PROCESS
Filed Feb. 9, 1946
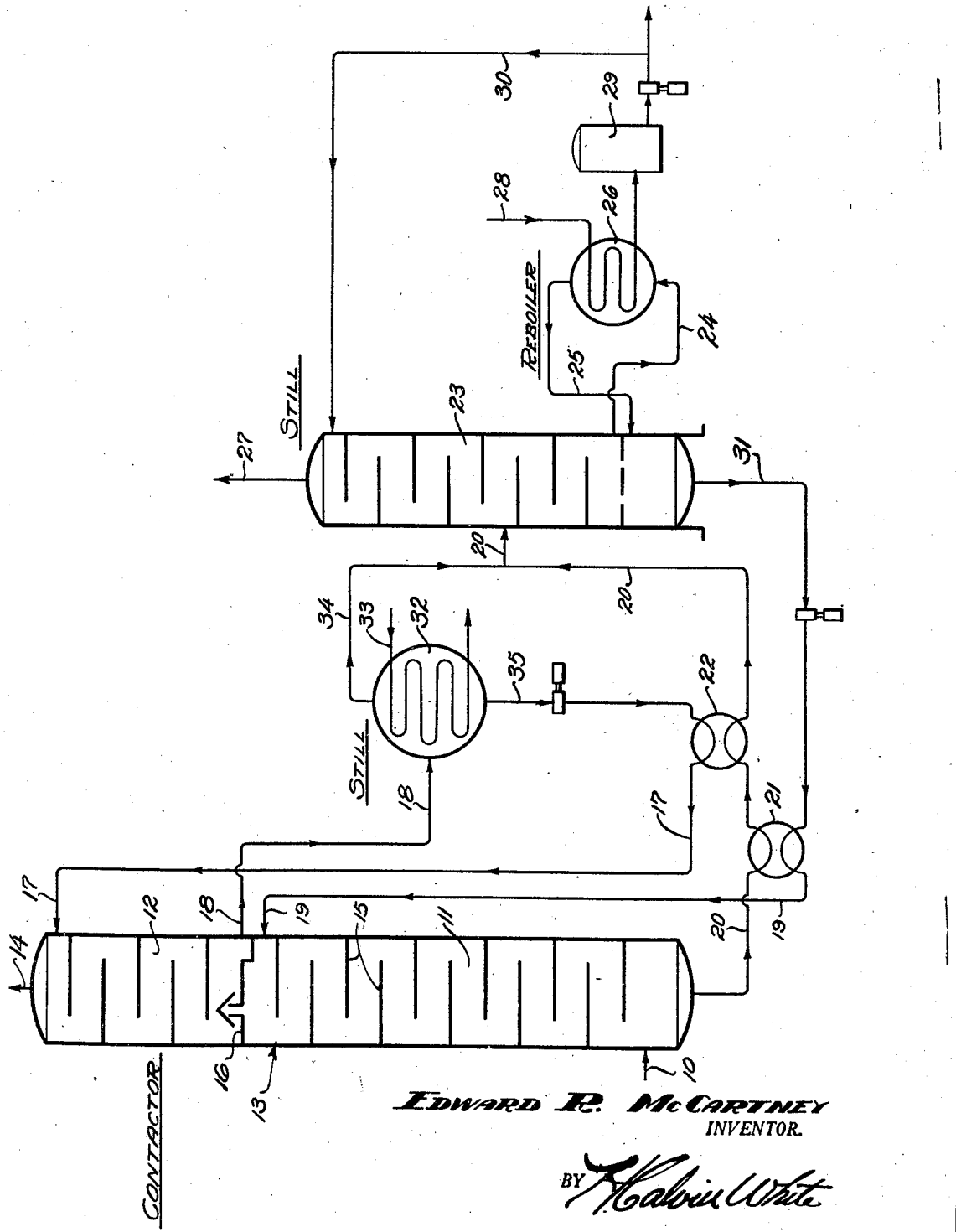
EDWARD R. McCARTNEY
INVENTOR.
BY
ATTORNEY Patented Jan. 27, 1948

2,435,089

UNITED STATES PATENT OFFICE 2,435,089

GAS PURIFICATION AND DEHYDRATION PROCESS

Edward R. McCartney, Altadena, Calif., assignor to The Fluor Corporation, Ltd., Los Angeles, Calif., a corporation of California Application February 9, 1946, Serial No. 646,663

9 Claims. (Cl. 23—2)

This invention relates to an improved process for the treatment of gases (e. g., natural gas and refinery gases) for the dehydration and removal of acidic constituents such as carbon dioxide and hydrogen sulphide. More particularly, the invention deals with gas treating processes employing a combination of absorbents, one being selected for absorption of the acidic constituents and the other as a moisture absorbent. Broadly, the invention contemplates the use of any suitable acid gas and moisture absorbents, the latter having the further properties of being higher boiling than and absorptive of the acid gas absorbent. Preferably I may use as the acid gas absorbent any of the liquid amines, or mixtures thereof, customarily employed for acid gas extraction, and for the moisture and amine absorbent any of the polyhydric alcohols or glycols customarily employed. (See Hutchinson Patent No. 2,177,068 on Process for treating gases.) Accordingly, the invention will be described with specific, though typical, reference to the use of amines and glycols respectively as the acid gas and moisture absorbents.

The invention has among its major objects the recovery of volatile amines which would otherwise be lost in the gas stream; reduction in the size and amount of equipment required; and reduction in operating costs through lowering of circulation rates.

In the conventional gas treating plant in which the gas is contacted with an amine-water solution, there is an unavoidable loss of the volatile amine by evaporation into the gas stream. The magnitude of this loss is determined by the concentration of amine in the solution. In order to minimize the loss, it is necessary to keep the concentration relatively low, resulting in large circulation rates by reason of the diluted volume of the solution.

When treatment of the gas for extraction of its acidic constituents is followed by dehydration, as by contacting the gas with a glycol water solution in a second contactor, the amine carried over in the gas stream will be absorbed into the glycol solution. The absorbed amine is released from the solution in the glycol regeneration still and lost in the overhead vapor stream.

Treatment and dehydration can be accomplished simultaneously by combining the amine-glycol and water in a single solution, as described in the above identified Hutchinson patent. A disadvantage in this method rises from the relationships between the molecular weights of the three components. These are such that in order to minimize or hold amine losses constant, it is necessary to use a much smaller volume percent of amine in the combination solution than in amine-water alone, with the result that circulation rates are proportionately large.

In accordance with the present invention, provision is made for permitting the use of relatively concentrated absorbents, and particularly amine solution, in a manner such that while partial vaporization of the amine results, what otherwise would be lost amine is recovered initially by absorption in the glycol absorbent, and ultimately by inclusion in the amine cycle. Generally speaking, the present process contemplates absorption of moisture and vaporized amine from the acid gas extraction stage, in the glycol absorbent, followed by vaporization of the absorbed amine and moisture from the glycol, and final recovery of the amine as by introducing the vapor mixture to an aqueous reflux stream in the amine still.

The details of the invention, as well as the operation of a typical and illustrative embodiment, will be more fully understood from the description to follow, together with the accompanying flow sheet.

Gas to be treated in the system, and consisting, for example, of natural gas containing moisture, carbon dioxide and sulphur dioxide, is fed through line 10 to the contacting zones which, as illustrated, may be contained within the lower and upper sections 11 and 12 of a single vertically extended contactor column 13 from which the treated gas leaves through outlet 14. The column may contain any suitable type and arrangement of trays or baffles 15 as required for intimacy of contact between the liquid and gas. The column sections 11 and 12 are separated by the total draw-off tray conventionally indicated at 16, through which the gas freed of its acidic constituents flows upwardly into the top section 12, and from which all the liquid absorbent introduced to the top section through line 17, is withdrawn by way of line 18.

The gas entering the lower section 11 is contacted by an amine solution introduced through line 19 and having a composition capable of absorbing the acidic constituents of the gas. Dehydration is secondary and may not occur to any appreciable degree, depending on the composition of the solution. In order to hold down the rate of circulation of the solution, it is desirable that the amine concentration be kept as high as practicable. Water, glycol or other diluents in the solution are added primarily as a vehicle for the heat of reaction, or in order to facilitate stripping at the still. Merely as illustrative, the acid gas absorbent may be composed of an aqueous amine solution containing 30 to 40 parts of amine, 20 to 30 parts glycol and the balance water.

The gas, together with vaporized and entrained amine, leaving the lower section of the contactor, passes through the total draw-off tray 16 into the upper section 12 wherein the gas is intimately contacted with the glycol solution introduced through line 17, and composed, for example, of an aqueous solution containing around 92 to 97 per cent of diethylene glycol. The hygroscopic glycol solution is absorptive of moisture from the gas (to a degree determinable by such conditions as temperature, pressure and concentrations, the relationship between which may be controlled) and also of the vaporized and entrained amine, so that the treated gas leaving through the outlet 14 is both dehydrated and substantially amine-free.

Spent amine solution is taken from the bottom of the contactor through line 20 and exchangers 21, 22 to the still 23. The latter is connected through lines 24 and 25 with the usual reboiler 26 in which the solution is heated and regenerated by volatilization of the absorbed acidic constituents. Gases and vapors released from the solution flow upwardly through the still to the outlet line 27 in intimate mixture with an aqueous reflux stream derived, for example, by condensation of steam supplied through line 28 to the reboiler, the condensate being pumped or pressured from the accumulator 29 through line 30 as reflux to the still. The regenerated amine solution is returned from the still through line 31 and exchanger 21 to line 19 entering the top of the lower contactor section 11.

The spent glycol solution leaving the contactor through line 18 passes through a second still conventionally indicated at 32, supplied with heat from steam coil 33 or other suitable source, the still being operated at a temperature sufficiently high to vaporize to any selected degree both moisture and amine from the glycol solution. As illustrative, the solution may be concentrated to a content of about 4 percent moisture and 0.1 percent amine. The vapors leaving still 32 pass through line 34 into still 23 wherein the vapor contact with the reflux stream results in the condensation and recovery of the amine, while permitting uncondensed water vapor to leave the system through line 27. In this manner the amine which in the ordinary system is lost by vaporization in the contactor, is recovered for return with the main body of the amine solution to the contactor. Leaving still 32, the regenerated glycol solution is returned to the contactor through line 35, exchanger 22 and line 17.

Any possible loss of amine to the gas stream leaving the top of the contactor will be determined by the concentration of amine in the regenerated glycol stream entering through line 17. This concentration can be controlled at any desired value by sufficient boiling in the glycol still 32, regardless of the quantity of amine carried into the still by the spent glycol stream. Thus it is possible to allow a high loss of amine from the lower section of the contactor into the upper section, and yet effect complete recovery of the amine, through proper control of the glycol solution concentration.

I claim:

1. The process of treating a gaseous mixture for the removal of moisture and an acidic compound, that includes contacting the gas with a first liquid absorbent for said acidic compound under conditions resulting in partial vaporization of the absorbent, then contacting the gas with a second higher boiling liquid absorbent in which is absorbed moisture and the vaporized first absorbent, passing the spent first absorbent through a first heating zone to regenerate the first absorbent by vaporization of the absorbed acidic compound, passing the spent second absorbent through a second heating zone to regenerate the second absorbent by vaporizing moisture and first absorbent therefrom, passing the resulting vapors into said first heating zone and therein recovering the vaporized first absorbent, and contacting gas to be treated successively with the regenerated first and second absorbents.

2. The process of treating a gaseous mixture for the removal of moisture and an acidic compound, that includes contacting the gas with a first liquid absorbent for said acidic compound under conditions resulting in partial vaporization of the absorbent, then contacting the gas with a second higher boiling liquid absorbent in which is absorbed moisture and the vaporized first absorbent, passing the spent first absorbent through a first heating zone to regenerate the first absorbent by vaporization of the absorbed acidic compound, passing the spent second absorbent through a second heating zone to regenerate the second absorbent by vaporizing moisture and first absorbent therefrom, condensing the vaporized first absorbent from the resulting vapors and recovering the condensed first absorbent in said first heating zone, and contacting gas to be treated successively with the regenerated first and second absorbent.

3. The process of treating a gaseous mixture for the removal of moisture and an acidic compound, that includes contacting the gas with a first liquid absorbent for said acidic compound under conditions resulting in partial vaporization of the absorbent, then contacting the gas with a second higher boiling liquid absorbent in which is absorbed moisture and the vaporized first absorbent, passing the spent first absorbent through a first heating zone to regenerate the first absorbent by vaporization of the absorbed acidic compound, passing the spent second absorbent through a second heating zone to regenerate the second absorbent by vaporizing moisture and first absorbent therefrom, condensing vapors liberated within said first heating zone in an aqueous reflux stream, contacting the vapors from said second heating zone with said reflux stream to condense the first absorbent contained in the vapors, and contacting gas to be treated successively with the regenerated first and second absorbents.

4. The process of treating a gaseous mixture for the removal of moisture and an acidic compound, that includes passing the gas upwardly through a lower section of a vertically extended contacting zone in intimate admixture with a first liquid absorbent for said acidic compound under conditions resulting in partial vaporization of the absorbent, then passing the gas through an upper section of said contacting zone in intimate admixture with a second higher boiling liquid in which is absorbed moisture and the vaporized first absorbent, passing the spent first absorbent from said lower section through a first heating zone to regenerate the first absorbent by vaporization of the absorbed acidic compound, separately passing the spent second absorbent from said upper section through a second heating zone to regenerate the second absorbent by vaporizing moisture and first absorbent therefrom, condensing the vaporized first absorbent from the resulting vapors and recovering the condensed first absorbent in said first heating zone, and returning the regenerated absorbents to said contacting zone.

5. The process of treating a gaseous mixture for the removal of moisture and an acidic compound, that includes contacting the gas with a liquid amine acid gas absorbent under conditions resulting in partial vaporization of the amine, then contacting the gas with a liquid glycol absorbent in which is absorbed moisture and the vaporized amine, passing the spent amine absorbent through a first heating zone to regenerate the amine absorbent by vaporization of the absorbed acid compound, passing the spent glycol absorbent through a second heating zone to regenerate the glycol absorbent by vaporizing moisture and amine therefrom, condensing the vaporized amine from the resulting vapors and recovering the condensed amine in said first heating zone, and contacting gas to be treated successively with the regenerated amine and glycol absorbents.

6. The process of treating a gaseous mixture for the removal of moisture and an acidic compound, that includes contacting the gas with a liquid amine acid gas absorbent under conditions resulting in partial vaporization of the amine, then contacting the gas with a liquid glycol absorbent in which is absorbed moisture and the vaporized amine, passing the spent amine absorbent through a first heating zone to regenerate the amine absorbent by vaporization of the absorbed acid compound, passing the spent glycol absorbent through a second heating zone to regenerate the glycol absorbent by vaporizing moisture and amine therefrom, maintaining a substantially constant residual concentration of amine and moisture in the regenerated glycol absorbent, condensing the vaporized amine from the resulting vapors and recovering the condensed amine in said first heating zone, and contacting gas to be treated successively with the regenerated amine and glycol absorbents.

7. The process of treating a gaseous mixture for the removal of moisture and an acidic compound, that includes contacting the gas with a liquid amine acid gas absorbent under conditions resulting in partial vaporization of the amine, then contacting the gas with a liquid glycol absorbent in which is absorbed moisture and the vaporized amine, passing the spent amine absorbent through a first heating zone to regenerate the amine absorbent by vaporization of the absorbed acid compound, passing the spent glycol absorbent through a second heating zone to regenerate the glycol absorbent by vaporizing moisture and amine therefrom, refluxing vapors liberated in said second heating zone with an aqueous reflux stream, contacting the vapors from said second heating zone with said reflux stream to condense the amine contained in the vapors, and contacting gas to be treated successively with the regenerated amine and glycol absorbents.

8. The process of treating a gaseous mixture for the removal of moisture and acidic compound, that includes contacting the gas with a liquid amine acid gas absorbent under conditions resulting in partial vaporization of the amine, then contacting the gas with a liquid glycol absorbent in which is absorbed moisture and the vaporized amine, passing the spent amine absorbent through a first heating zone to regenerate the amine absorbent by vaporization of the absorbed acid compound, passing the spent glycol absorbent through a second heating zone to regenerate the glycol absorbent by vaporizing moisture and amine therefrom, maintaining a substantially constant residual concentration of amine and moisture in the regenerated glycol absorbent, refluxing vapors liberated in said second heating zone with an aqueous reflux stream, contacting the vapors from said second heating zone with said reflux stream to condense the amine contained in the vapors, and contacting gas to be treated successively with the regenerated amine and glycol absorbents.

9. The process of treating a gaseous mixture for the removal of moisture and an acidic compound, that includes passing the gas upwardly through a lower section of a vertically extended contacting zone in intimate admixture with a liquid amine absorbent under conditions resulting in partial vaporization of the amine, then passing the gas upwardly through an upper section of said contacting zone in intimate admixture with a liquid higher boiling glycol absorbent in which is absorbed moisture and the vaporized amine, passing the spent amine absorbent from said lower section through a first heating zone to regenerate the amine absorbent by vaporization of the absorbed acidic compound, separately passing the spent glycol absorbent from said upper section through a second heating zone to regenerate the glycol absorbent by vaporizing moisture and amine therefrom, refluxing vapors liberated in said second heating zone with an aqueous reflux stream, contacting the vapors from said second heating zone with said reflux stream to condense the amine contained in the vapors, and contacting gas to be treated successively with the regenerated amine and glycol absorbents in said sections of the contacting zone.

EDWARD R. McCARTNEY.